(12) United States Patent
Ghabra et al.

(10) Patent No.: US 8,374,744 B2
(45) Date of Patent: Feb. 12, 2013

(54) TIRE PRESSURE MONITOR SIGNAL PROCESSING

(75) Inventors: Riad Ghabra, Dearborn Heights, MI (US); John Nantz, Brighton, MI (US); Zoran Kovac, Macomb Township, MI (US); Kevin Cotton, Fenton, MI (US)

(73) Assignee: Lear Corporation, Southfield, MI (US)

( * ) Notice: Subject to any disclaimer, the term of this patent is extended or adjusted under 35 U.S.C. 154(b) by 1784 days.

(21) Appl. No.: 11/537,778

(22) Filed: Oct. 2, 2006

(65) Prior Publication Data

US 2008/0082227 A1 Apr. 3, 2008

(51) Int. Cl.
- *G01M 17/00* (2006.01)
- *G06F 7/00* (2006.01)
- *G06F 11/30* (2006.01)
- *G06F 19/00* (2011.01)
- *G07C 5/00* (2006.01)

(52) U.S. Cl. .............. 701/29.1; 701/29.2; 701/29.6; 701/29.7

(58) Field of Classification Search .......... 340/442, 340/444, 445, 446, 447, 448; 73/146.5
See application file for complete search history.

(56) References Cited

U.S. PATENT DOCUMENTS

| | | | |
|---|---|---|---|
| 4,947,407 A | 8/1990 | Silvian | |
| 5,319,191 A | 6/1994 | Crimmins | |
| 6,232,875 B1 | 5/2001 | DeZorzi | |
| 6,420,967 B1 | 7/2002 | Ghabra et al. | |
| 6,501,372 B2 * | 12/2002 | Lin | 340/442 |
| 6,580,364 B1 | 6/2003 | Munch et al. | |
| 6,630,885 B2 | 10/2003 | Hardman et al. | |
| 6,640,090 B1 | 10/2003 | Kitahara et al. | |
| 6,650,236 B2 | 11/2003 | Ghabra et al. | |
| 6,696,935 B2 * | 2/2004 | Bonardi et al. | 340/447 |
| 6,885,283 B2 | 4/2005 | O'Connor et al. | |
| 6,940,461 B2 | 9/2005 | Nantz et al. | |
| 6,941,801 B2 | 9/2005 | Lemense et al. | |
| 7,224,269 B2 * | 5/2007 | Miller et al. | 340/444 |
| 7,762,129 B2 * | 7/2010 | Niklas et al. | 73/146.5 |
| 2002/0075145 A1 | 6/2002 | Hardman et al. | |
| 2002/0101335 A1 | 8/2002 | Ghabra et al. | |
| 2002/0126005 A1 * | 9/2002 | Hardman et al. | 340/442 |
| 2003/0122660 A1 | 7/2003 | Kachouh et al. | |
| 2004/0124912 A1 | 7/2004 | Desai et al. | |
| 2005/0093686 A1 | 5/2005 | LeMense et al. | |
| 2005/0104722 A1 | 5/2005 | Tang et al. | |
| 2005/0156724 A1 | 7/2005 | Shibata | |
| 2005/0232376 A1 * | 10/2005 | Liem et al. | 375/322 |
| 2006/0158324 A1 * | 7/2006 | Kramer | 340/447 |
| 2006/0244598 A1 * | 11/2006 | Hyde et al. | 340/572.1 |

* cited by examiner

*Primary Examiner* — Khoi Tran
*Assistant Examiner* — Nicholas Kiswanto
(74) *Attorney, Agent, or Firm* — Brooks Kushman P.C.

(57) ABSTRACT

System for processing tire pressure monitor (TPM) signals. The system include capabilities to support amplitude shift key (ASK) modulation of TPM data signals transmitted from TPMs included within one or more tires of a vehicle. The system may include a receiver and controller to process the TPM signals.

20 Claims, 2 Drawing Sheets

TIRE PRESSURE MONITOR SIGNAL PROCESSING

BACKGROUND OF THE INVENTION

1. Field of the Invention

The present invention relates to processing tire pressure monitor (TPM) data signals.

2. Background Art

It is challenging to use amplitude shift key (ASK) modulation in the transmission of tire pressure monitor (TPM) signals from a tire to an electronic control unit (ECU) because of residual amplitude modulation (AM). As the tire spins, the signal amplitude varies and interferes with the ability of an associate receiver to decode (slice) signals (data) transmitted from the TPM.

The root cause for the problem is that the average bit value at the data slicer does not change fast enough to keep up with the rapidly changing data amplitude due to the slow nature of the RC circuit that accomplishes the averaging for the reference. The end effect is that the current data slicer reference is actually relevant more to the previous data bit than to the current one. However, it is desirable to use ASK because of the significant improvement in battery life that can be obtained along with 6dB higher peak power allowed by the FCC (on average).

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
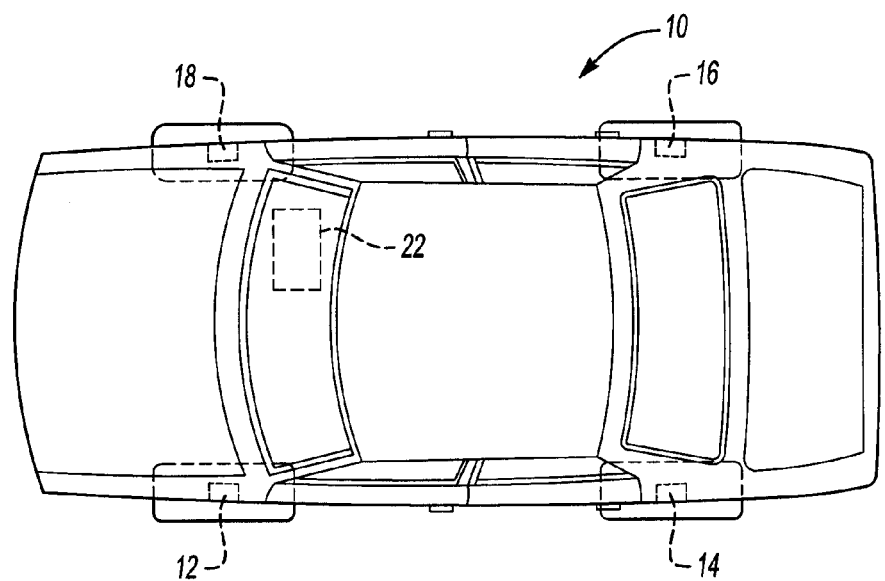
FIG. 1 illustrates a tire pressure monitoring system in accordance with one non-limiting aspect of the present invention.

FIG. 1 illustrates a tire pressure monitoring system 10 in accordance with one non-limiting aspect of the present invention. The system 10 may include a number of tire pressure monitors (TPMs) 12-18 in communication with an electronic control unit (ECU) 22. The TPMs 12-18 may be configured to wirelessly communicate tire operating conditions to the ECU 22. The ECU 22, in turn, may then use the corresponding information in any number of operations, as one skilled in the art will appreciate.

The TPMs 12-18 may include any number of features to facilitate monitoring and reporting on any number of operations associated with tire operating conditions, such as but not limited to monitoring and/or reporting on tire pressure, temperature, air quality, etc. The ECU 22 may use this information in reporting any number of tire conditions to a vehicle operator, such as but not limited maintenance logging and scheduling, flat tire monitoring, etc.

The TPMs 12-18 may include a sensing and signal processing section (not shown) for generating a data signal indicative of the tire operating conditions. The signals may be encoded or otherwise packaged for transmitting to the ECU 22. For example, the TPMs 12-18 may be of the type commonly in the art.

Optionally, the TPMs 12-18 may be configured to support ASK based communications with the ECU 22. As noted in the Background section, ASK based communications may be challenging to employ due to residual AM modulation associated with the variable rotation speeds of the rotating TPMs 12-18. The variable rotation speeds of the rotating TPMs 12-18 may outpace the relatively slow RC processing of the ECU (receiver—see below) 22.

The TPMs 12-18 and ECU 22may include any number of other configurations and features without deviating from the scope and contemplation of the present invention. The present invention fully contemplates using the TPMs 12-18 and ECU 22 for performing any number of operations and functions in addition to and/or in place of those enumerated above. As such, the present invention is not intended to be limited or unnecessarily limited to the foregoing as the foregoing is provided for exemplary purposes only.

Figure 2:
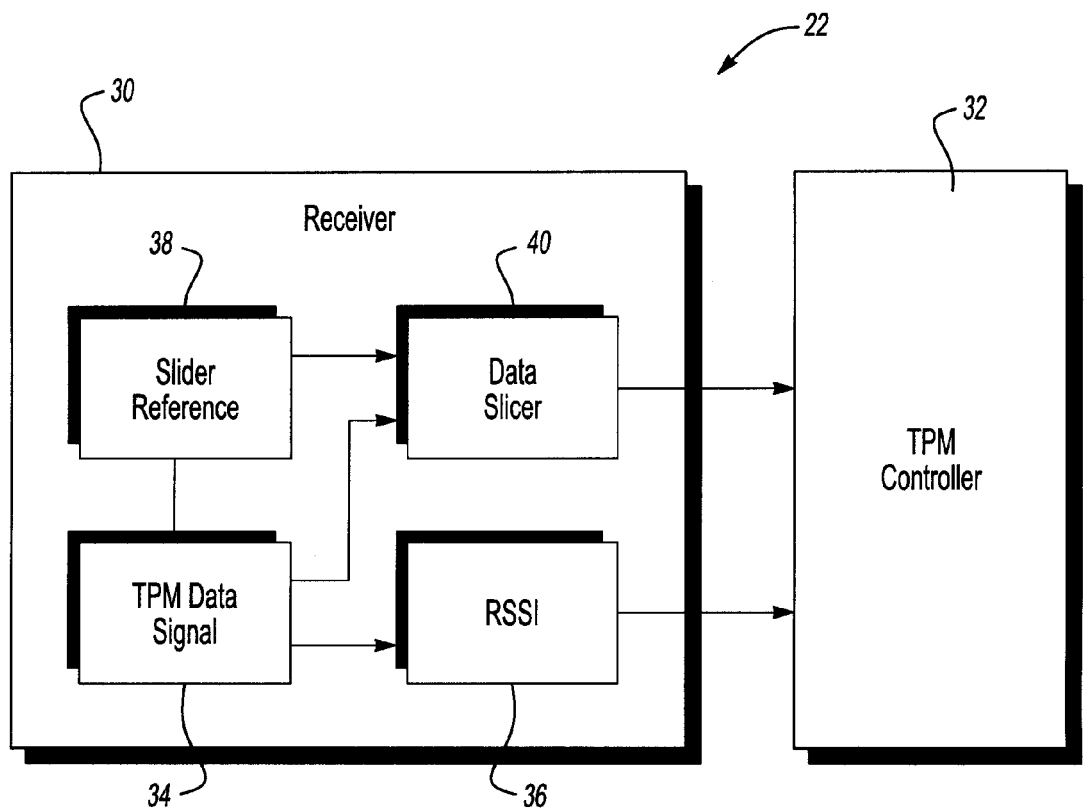
FIG. 2 schematically illustrates a receiver and controller of the ECU in accordance with one non-limiting aspect of the present invention.

FIG. 2 schematically illustrates a receiver 30 and controller 32 of the ECU 22 in accordance with one non-limiting aspect of the present invention. The receiver 30 may be configured to process signals transmitted from the TPMs 12-18 for input to the controller 32. The controller 32 may then convert the analog signals of the receiver 30 to digital signals suitable for use in assessing tire operating conditions. Optionally, as described below in more detail, the controller 32 may include features designed to support ASK communications between the TPMs 12-18 and ECU 22.

The receiver 30 may include any number of logically function modules to support any number of operations associated with receiving signals from the TPMs 12-18, including but not limited to TPM data signal module 34, a Received Signal Strength Indication (RSSI) module 36, a slicer reference module 38, and/or a data slicer module 40. Each of the modules 34-40 may be associated with particular signal processing for use in facilitate analysis with the controller 32.

The TPM data signal module 34 may associated with receiving TPM data signals from the various TPMs 12-18. The module 34 may perform any number of functions associated with receiving and differentiating the TPM data signals for processing by the other modules as required by the present invention.

The RSSI module 36 may be associated with generating a relative signal strength value for the TPM transmitted data signals. The RSSI values may vary with variance in signal strength of the associated TPM 12-18. For example, as the TPMs 12-18 rotate during vehicle movement, the RSSI signal will correspondingly vary with the tire rotation as long as the TPMs 12-18 consistently emit signals at the same signals strength due the distance between the TPMs 12-18 and receiver 30 changing with the tire rotation.

The slicer reference module 38 may be associated with generating a slicer reference signal suitable for use in slicing the TPM transmitted data signals. The slicer reference value generally corresponds with an averaging of the transmitted TPM data signals. The averaging may be provide with an RC based circuit arrangement, as one having ordinary skill in the art will appreciate.

The data slicer module 40 may be used to compare the TPM transmitted data signal against the slicer reference signal. This comparison may be used for outputting a receiver data signal to the controller 32. This may include comparing a current value of the TPM transmitted data signal against the averaged value associated with the slicer reference module 38 to determine whether the current value is greater or less than the average. The receiver data signal may then be communicated to the controller 32 for use in assessing tire operating conditions.

The controller 32 may include any number of features, modules, or other processing elements associate with processing one or more of the receiver signals. The controller may include gap processing capabilities that allow the controller to process TPM data packets having transmission gaps associated with the inability of the receiver 30 to keep up with the rotationally induced AM. In this manner, the present invention is able to process TPM packets having missing bits of information.

Figure 3:
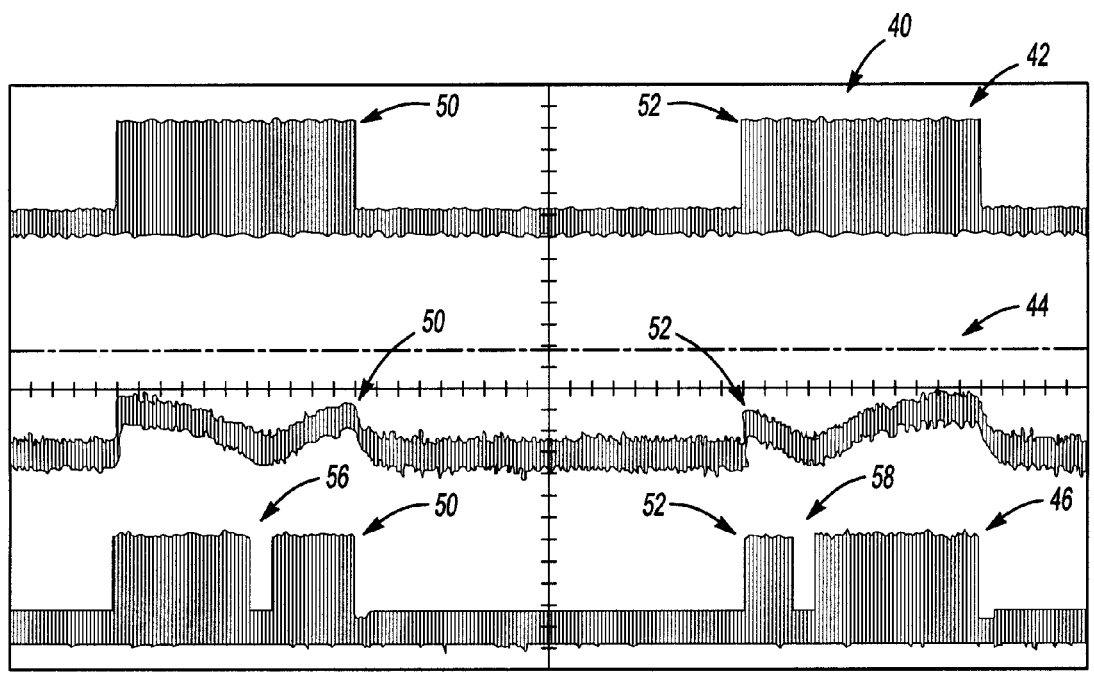
FIG. 3 graphically illustrates the signals associated with the system in accordance with one non-limiting aspect of the present invention.

FIG. 3 graphically illustrates a graph 40 of the signals associated with the system in accordance with one non-limiting aspect of the present invention. The signals include the TPM data signal, the RSSI signal, and the receiver data signal, respectively referred to with numerals 42-46. These signals 42-46 are shown for exemplary purposes only and without intending to limit the scope and contemplation of the present invention.

The TPM data signal 42 corresponds with an exemplary illustration of signals that may be communicated to the receiver 30 to report the tire operating conditions. The TPM data signal 42 may be divided in discrete data packets 50-52. The data packets 50-52 may be periodically transmitted from the TPMs 12-18 according to the associated transmission protocols. The packets 50-52 may contain bits of information associated with the tire operating conditions.

The RSSI signal 44 corresponds with an exemplary illustration of RSSI values associated with the TPM data signal as determined by the RSSI module 36 of the receiver 30. The RSSI signal 44 corresponds with an approximately sinusoidal pattern during packet transmission periods 50-52. The sinusoidal nature of the RSSI signal 44 corresponds with the TPM data signal strength varying as the TPMs 12-18 rotate around the tire, i.e., the residual AM.

The receiver data signal 46 corresponds with an exemplary illustration of the data sliced from the TPM data signal 42 with the data slicer 40. As shown, the receiver data signal 46 may include one or more gaps 56-58 within the boundaries of a corresponding TPM data signal data packets 50-52. The gaps 56-58 are associated with delays in the ability of the RC components of the slicer reference 38 to keep up with the amplitude variations of the TPM data signal 42 induced with tire rotation. For the purposes of the present invention, packets 50-52 having missing information or gaps 56-58 may be referred to as partial packets.

In the past, partial packets 50-52 were thrown out or otherwise marked as having errors such that the packets 50-52 were unsuitable for processing with the controller. To combat the problem, prior approaches utilized brute force techniques of constantly or relatively constantly transmitting the TPM data signal to the receiver in the hopes that a complete TPM data packet would eventually reach the controller. This approach consumes unnecessary TPM battery strength.

The present invention includes gap processing capabilities to improve upon the above-mentioned brute force techniques. One gap processing capability of the present invention relates to facilitating processing of TPM data packets 50-52 having one or more missing bits of information, i.e. gaps 56-58. This allows the present invention to make use of the data packet and any information that can be gleaned therefrom. The present invention is able to provide suitable TPM processing with minimal TPM data signal transmissions, thereby conserving TPM battery strength.

One of the gap processing methodology of the present invention relates to the controller 32 applying an error correction methodology to the partial packet 50-52. For example, the error correction methodology may comprise accepting the data arriving before and after the gap 56-58. This allows the controller 32 to utilize the received information without discarding the entire packet 50-52. This controller 32 may optionally compare the partial packet 50-52 with subsequent full or partial packets to ascertain the nature of the gap 56-58 and/or to replace the gap 56-58 with information from subsequent packets.

Another error correction methodology of the present invention may comprise the controller 32 filing in or otherwise substituting information for the missing information based on other signals associated with the receiver 30. For example, the controller 32 may monitor the RSSI signals for a sudden change typically associated with the inability of the RC components of the receive to keep pace with the signal variations, i.e., characteristics associated with creation of the gaps. Alternatively, the controller 32 may monitor other tire or vehicle operating conditions to determine the occurrence of a gaps 50-52, such as but not limited to monitoring signal strength and/or tire rotation speed. Once the controller determines the present of the gaps 50-52, it can quickly fill in the gap based on the RSSI signal.

The controller 32, for example, may convert the RSSI into a digital signal that it can decode for use in discovering the missing information. In this manner, the controller 32 may rely upon the data slicer information until conditions commonly associated with gaps occur, at which time, the controller may then rely on the RSSI signal. This allows the controller to user both the data slicer signal and the RSSI signal in determining information from associated with partial TPM data packets.

Another error correction methodology may comprise the controller 32 time delaying input of the TPM data signal to the data slicer 40 and/or buffering the TPM data signal for subsequent comparison with the slicer reference signal. The time delay and buffering are aimed at synchronizing the TPM data signal with the processing delays associated with the RC nature of the slicer reference module 38. A similar results may be optionally achieved by buffering the data slicer signal, as opposed to just the TPM signal, for subsequent and additional comparison with the TPM data signal.

Another error correction methodology may comprise eliminating or ignoring the slicer reference 38 and data slicer modules 40 and processing the TPM data signal as a function of the RSSI signal. The RSSI signal may be outputted to the controller 32 and the controller 32, with its improved processing capabilities relative to the RC nature of the slicer reference 38 and data slicer modules 40, may convert the RSSI into a digital signal that it can use for recovering the TPM data packets 50-52 without the gaps 50-52 associated with the RC delays such that the data slicer signal may be ignored in favor RSSI based processed. The processing of the controller 32 in this manner may be advantageous for use with known and/or deployed receivers as it merely requires updating the controller 32 with logic associated with processing the TPM data packets solely as a function of the RSSI signal.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tire pressure monitoring system having capabilities for processing amplitude shift key (ASK) tire pressure monitor (TPM) data signals, the system comprising:
a receiver configured to receive the ASK TPM data signals from one or more TPMs configured to monitor operating conditions of a tire; and
a controller in communication with the receiver and configured to process partial TPM data packets according to a gap processing methodology, the partial TPM data packets each having at least one gap of unusable information due to an inability of the receiver to compensate for residual amplitude modulation (AM) in the TPM data signal resulting from rotation of the tire, the controller replacing the unusable information with usable information.

2. The tire pressure monitoring system of claim 1 wherein the gap processing methodology includes the controller processing portions of the partial TPM data packet occurring before and after one or more of the gaps to determine the usable information, the usable information being information occurring before and after one or more of the gaps.

3. The tire pressure monitoring system of claim 1 wherein the gap processing methodology includes determining the usable information to be used in place of the unusable information associated with one or more of the gaps as a function of subsequently received TPM data packets, the usable information being information associated with the one or more of the gaps.

4. The tire pressure monitoring system of claim 1 wherein the gap processing methodology includes determining the usable information to be used in place of the unusable information associated with one or more of the gaps to be information included as part of an RSSI signal associated with the TPM data signal, the RSSI and non-RSSI signals being commonly determined from filtering the TPM data signal.

5. The tire pressure monitoring system of claim 4 wherein the gap processing methodology includes relying on the RSSI signal to determine the usable information when the RSSI signal is less than a threshold, the threshold corresponding with conditions during which the receivers unable to compensate for residual AM.

6. The tire pressure monitoring system of claim 1 wherein the gap processing methodology includes buffering signals associated with the receiver to compensate for RC delays introducing the gap in the partial TPM data signal.

7. The method of claim 6 wherein the buffering includes buffering the TPM data signal prior to input to a data slicer, the data slicer configured to compare the TPM data signal against a slicer reference signal.

8. The method of claim 6 wherein the buffering includes delaying processing of a data slicer with respect to the TPM data signal so as to synchronize the TPM data signal with a slicer reference signal, the data slicer configured to compare the TPM data signal against the slicer reference signal.

9. The tire pressure monitoring system of claim 1 wherein the unusable information is part of non-RSSI signals and the usable information used to replace the unusable information is determined from RSSI signals, the non-RSSI signals and the RSSI signals being determined from filtering of the same TPM data signal.

10. The tire pressure monitoring system of claim 1 wherein the gap processing methodology includes the controller converting RSSI signals to digital signals and using the converted RSSI signals in place of the unusable information.

11. A tire pressure monitoring system having capabilities for processing amplitude shift key (ASK) tire pressure monitor (TPM) data signals, the system comprising:
a receiver having a TPM data signal module, slicer reference module, RSSI module, and data slicer module, the TPM data signal module configured to receive the ASK TPM data signals for output to the slicer reference module, the RSSI module, and the data slicer module, the slicer reference module configured to average the TPM data signal for output as a slicer reference signal to the data slicer, the data slicer configured to generate a data slicer signal as a function of the slicer reference and the TPM data signal, and the RSSI module configured to output an RSSI signal as a function of the TPM signal, wherein the slicer reference module includes RC components to facilitate averaging the TPM data signals whereby the RC components cause gaps to form in the data slicer signal due to an inability of the slicer reference module to process sudden changes in the TPM data signal, the gaps defining portions of each TPM data signal missing usable data; and
a controller in communication with the receiver and configured to process partial TPM data packets included in the data slicer signal as a function of the RSSI signal such that the RSSI signal is used in place of the missing usable data.

12. The tire pressure monitoring system of claim 11 wherein the controller executes a gap processing methodology in order to process the partial TPM data packets.

13. The tire pressure monitoring system of claim 12 wherein the gap processing methodology includes processing portions of the partial TPM data packet occurring before and after the gap and processing the RSSI signal occurring during the gap.

14. The tire pressure monitoring system of claim 12 wherein the gap processing methodology includes determining information associated with the gap as a function of the RSSI signal.

15. The tire pressure monitoring system of claim 14 wherein the gap processing methodology includes processing the RSSI signal in response to conditions associated with formation of the gap in the partial TPM data packet.

16. The tire pressure monitoring system of claim 12 wherein the gap processing methodology includes ignoring non-RSSI signals and determining the TPM data packets as a function of RSSI signals.

17. The tire pressure monitoring system of claim 12 wherein the gap processing methodology includes the controller converting the RSSI signals to digital signals.

18. A tire pressure monitoring system having capabilities for processing amplitude shift key (ASK) tire pressure monitor (TPM) data signals, the system comprising:
a receiver configured to receive the ASK TPM data signals from one or more TPMs and to convert the ASK TPM data signals to an RSSI signal; and
a controller in communication with the receiver and configured to recover data missing from TPM data packets included with the TPM data signals from the RSSI signal.

19. The system of claim 18 wherein the controller is configured to convert the RSSI signal to a digital signal and to recover the TPM data packets from the digital signal.

20. The system of claim 19 wherein the recovered TPM data packets are recovered without gaps.

* * * * *